United States Patent [19]
Ito et al.

[11] Patent Number: 5,372,399
[45] Date of Patent: Dec. 13, 1994

[54] BODY STRUCTURE FOR AUTOMOTIVE VEHICLE

[75] Inventors: Keizo Ito, Hiroshima; Mitsusou Nakano, Kure, both of Japan

[73] Assignee: Mazda Motor Corportion, Hiroshima, Japan

[21] Appl. No.: 117,835

[22] Filed: Sep. 8, 1993

[30] Foreign Application Priority Data

| Sep. 8, 1992 [JP] | Japan | 4-239108 |
| Sep. 8, 1992 [JP] | Japan | 4-239109 |
| Sep. 16, 1992 [JP] | Japan | 4-246239 |

[51] Int. Cl.$^5$ .......................... B60N 2/32; B62D 39/00
[52] U.S. Cl. .................................. 296/65.1; 296/68.1; 180/89.17
[58] Field of Search .................. 296/63, 65.1, 68.1, 296/204; 180/89.17

[56] References Cited

U.S. PATENT DOCUMENTS

| 3,583,518 | 6/1971 | Bichel et al. | 180/89.17 X |
| 4,311,205 | 1/1982 | Goodacre et al. | 296/65.1 X |
| 4,325,446 | 4/1982 | Hicks | 180/89.17 |
| 4,429,761 | 2/1984 | Haddock, Jr. et al. | 296/65.1 X |
| 4,930,593 | 6/1990 | Swartzendruber et al. | 180/89.17 |

FOREIGN PATENT DOCUMENTS

| 56-48961 | 9/1954 | Japan . | |
| 61-97078 | 6/1986 | Japan . | |
| 95947 | 4/1989 | Japan | 296/63 |

*Primary Examiner*—Dean J. Kramer
*Attorney, Agent, or Firm*—Keck, Mahin & Cate

[57] ABSTRACT

A vehicle body structure, in which seats are placed side by side above an engine mounted across a floor of a vehicle compartment, has a hole for an access to the engine. A seat mount platform, disposed above the access hole, is interconnected by a hinge mechanism foldable along a fold line so as to be turned up and down about the fold line, thereby opening and closing the access hole.

20 Claims, 10 Drawing Sheets

BODY STRUCTURE FOR AUTOMOTIVE VEHICLE

BACKGROUND OF THE INVENTION

1. Field of the Invention

The present invention relates to a structure for the lower portion of an automotive vehicle body, and, more particularly, to a lower body structure for an automotive vehicle in which a seat is installed above an engine disposed above and below a floor of a vehicle compartment.

2. Description of Related Art

Automotive vehicles which have engines located under passenger's compartments are classified as a "cab-over type." For a vehicle body for such a cab-over type of automotive vehicle, an access opening or hole is provided for an access to an engine for maintenance and servicing. This access opening or hole is covered and concealed by a seat mount platform, elevated from a floor, on which a seat is mounted. This seat mount platform is connected to the floor panel by means of a hinge means so as to turn up and down about a pivot axis of the hinge means, thereby opening and closing the access opening or hole. Such lower body structures are known from, for example, Japanese Unexamined Utility Model Publications Nos. 56-48961 and 61-97078.

With the lower body structure described in the above mentioned publication, because the seat mount platform is elevated upward from the floor, the structural rigidity is not always sufficient. The seat mount platform with an insufficient structural rigidity is often subjected to vibrations. In addition, a hinge means, only by means of which the seat mount platform is supported when it is turned upward so as to open the access hole, is insufficient to carry a large load including the weight of a seat and the floor is subjected to a large load through the hinge means. Further, when a great deal of energy is applied backward to the seat during, for instance, applying abrupt braking, there is a fear that the seat mount platform is forced to turn upward or be broken.

If a center tunnel is formed with an opening or hole for access to an engine from the back for engine servicing, structural rigidity is decreased, and, hence, the structural rigidity of a vehicle body is adversely affected, in particular, in close proximity of each center pillar. This is because, the center tunnel is essentially provided in order to provide an increased rigidity of vehicle body.

SUMMARY OF THE INVENTION

It is a primary object of the present invention to provide a lower body structure for a cab-over type automotive vehicle in which a seat mount platform, elevated from a floor above an access hole, is increased in structural rigidity.

It is another object of the present invention to provide a lower body structure for a cab-over type automotive vehicle in which a structure around an access hole is reinforced and increased in structural rigidity.

The above objects of the present invention are achieved by providing a lower body structure for an automotive vehicle in which two seats, such as a driver seat and a passenger seat, are separately placed side by side above a power unit, including at least an engine mounted across a floor of a vehicle compartment and openings or holes are provided for access to the power unit for servicing. A seat mount means, for mounting thereon the seats, is disposed above the access hole and supported at its back by means of a gusset means, secured to the floor and abutting against the seat mount means. A hinge means, by means of which the floor and seat mount means are interconnected, allows the seat mount means to be turned up and down about a fold axis or line thereof so as to open and close the access hole. This hinge means is adapted and disposed so as to lay the fold line on the gusset means.

Specifically, the lower body structure includes a cross member transversely extending and secured to the floor where the hinge portion is secured. The seat mount means, such as a platform, includes modesty wall means extending upward from said floor for defining the access hole with its upper edge and configured to provide a horizontal upper edge portion and an inclined upper edge portion extending inwardly upward from the horizontal upper edge portion. The seat mount means further includes a pair of slide rails secured to the top thereof for mounting thereon each seat for back and forth sliding movement.

The lower body structure further comprises a center tunnel projecting approximately vertically into the compartment from the floor and extending in a lengthwise direction of the vehicle body between the pair of two seats. This tunnel member is provided with an opening in its rear end for access to the power unit, such as an engine and a transmission, which opening is reinforced by means of a cross member transversely extending within the compartment between center pillars. Each floor frame and the floor panel are interconnected by means of a gusset means to which the cross member is secured.

The lower body structure further includes a safety means, disposed between the seat mount means and each floor frame member, which restricts or prevents the seat mount means from being turned upward when a great deal of energy is abruptly applied backward to the seat. This safety means comprises a gusset means for interconnecting each floor frame and the floor and a hook means secured to the seat mount means. The hook means is brought into engagement with the gusset when the seat mount means is abruptly turned upward.

BRIEF DESCRIPTION OF THE DRAWINGS

The above and other objects of the present invention will be apparent and understood from the following description of a preferred embodiment thereof when considered in conjunction with the accompanying drawings, in which.

DETAILED DESCRIPTION OF THE PREFERRED EMBODIMENT

Figure 1:
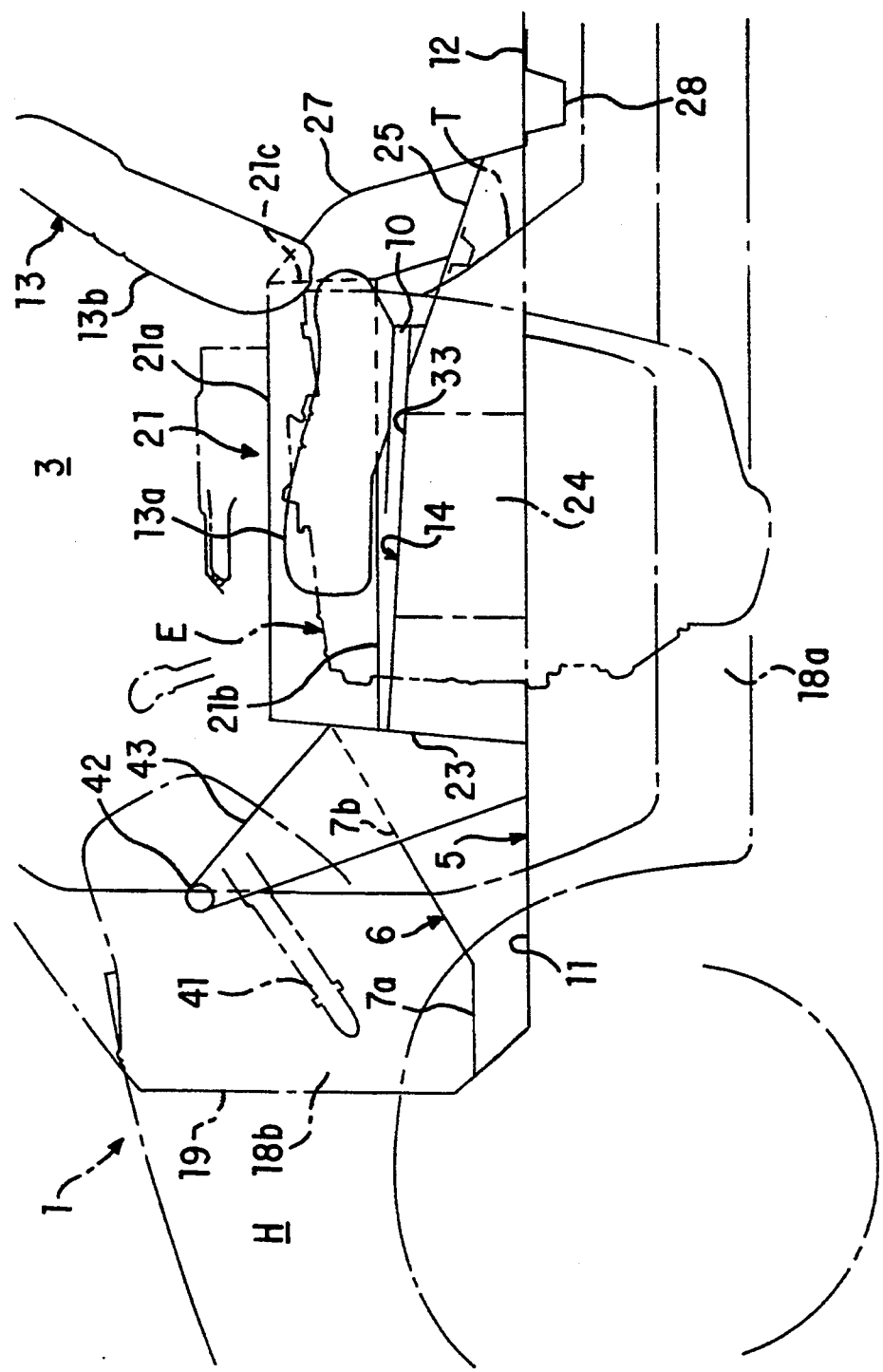
FIG. 1 is a schematic side view of a front, lower body structure in accordance with a preferred embodiment of the present invention.
Figure 2:
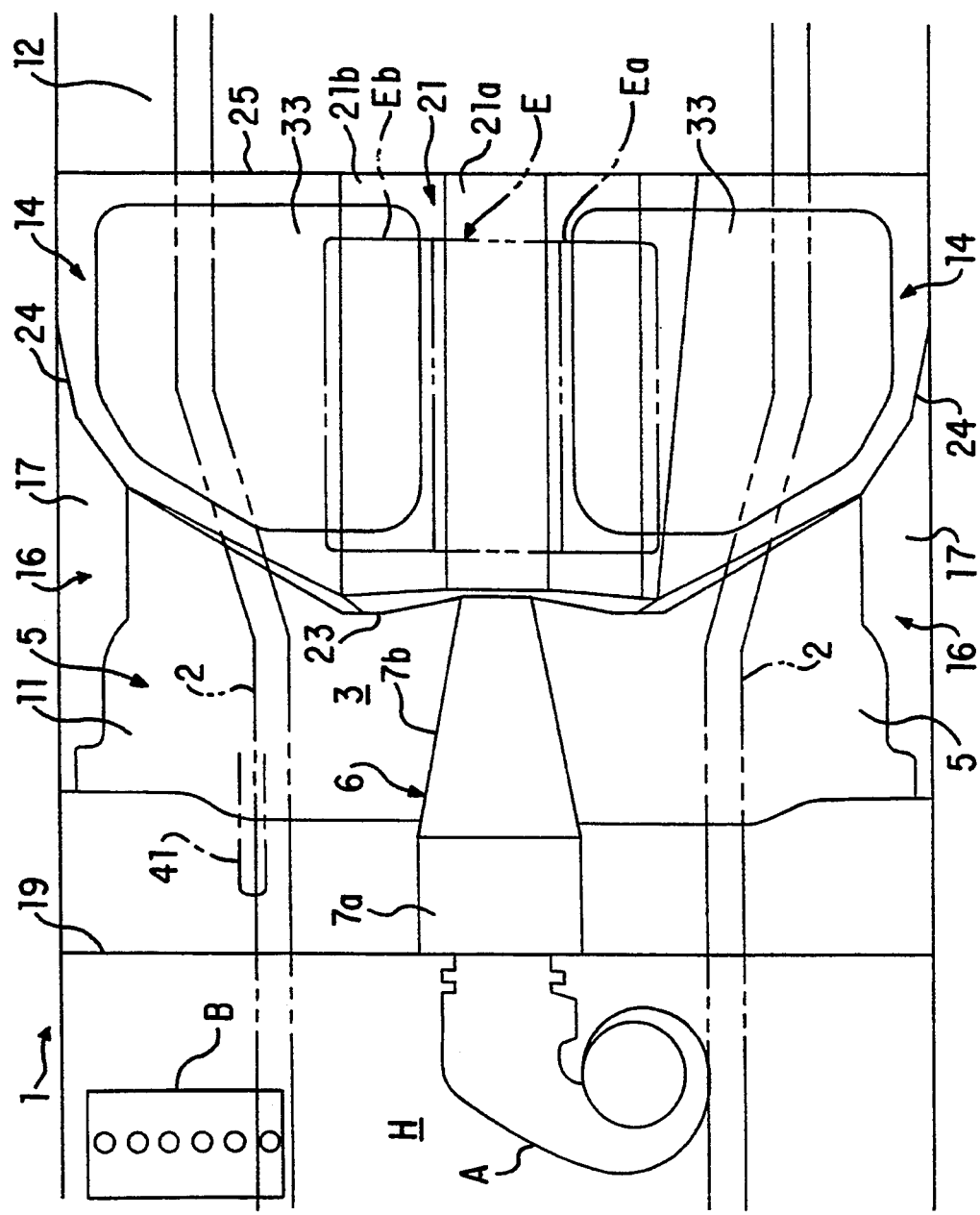
FIG. 2 is a plan view of the front, lower body structure.

Referring to the drawings in detail, and, in particular, to FIGS. 1 and 2 showing a lower configuration of a cab-over type of the vehicle body 1 of, for instance, one-box automotive vehicle, which is structured on a floor frame comprised of a pair of, i.e. left and right, floor frame members 2, such as U-shaped channel members, each of which extends in the lengthwise direction of the vehicle body 1 from front to back. The vehicle body 1 has a compartment 3, defined and located above an engine, such as a V-type six-cylinder engine E having two cylinder banks Ea and Eb arranged in a V-formation, and transmission T disposed behind the engine E. This engine E is mounted such that its crankshaft is placed so as to extend in the lengthwise direction. The compartment 3 is defined partly by a floor 5 comprised of a front floor panel 11, on which feet of passengers sitting on a front seat or front seats are placed, and a rear floor panel 12, both of which are a welded, or otherwise secured, to the upper surface of the floor frame members 2. In the transverse middle of the compartment 3 there is formed a tunnel 6 convex to the inside of the compartment 3 and extending from the front end of the compartment 3 toward the back in the lengthwise direction so as to increase the structural rigidity of the vehicle body 1. This tunnel 6 has a front tunnel portion 7a, formed integrally with the front floor panel 11 and elevated upward, and a rear tunnel portion 7b, comprised of a generally U-shape member, which opens underside and inclines upward at an angle and extends rearward from the rear end of the front tunnel portion 7a in the lengthwise direction.

The front and rear floor panels 11 and 12 are separated from each other in the lengthwise direction so that the engine E projects partly above the floor 5. Behind the tunnel 6, there is provided a seat mount platform 14, located between the front and rear floor panels 11 and 12 and above the engine E, on which seats 13 assigned to a driver and a passenger, each having a seat cushion 13a and a seat back 13b, are mounted behind and on opposite transverse sides of the tunnel 6. Specifically, this seat mount platform 14 is provided with a pair of inner and outer slide rails 10, having a generally C-shaped cross section and secured to the seat mount platform 14 by means of bolts 50, on which the seat 13 is attached so as to slid back and forth. As will be described in detail later, under each seat 13 the seat mount platform 14 is formed with an opening or hole 22 for access to the engine E.

Figure 3:
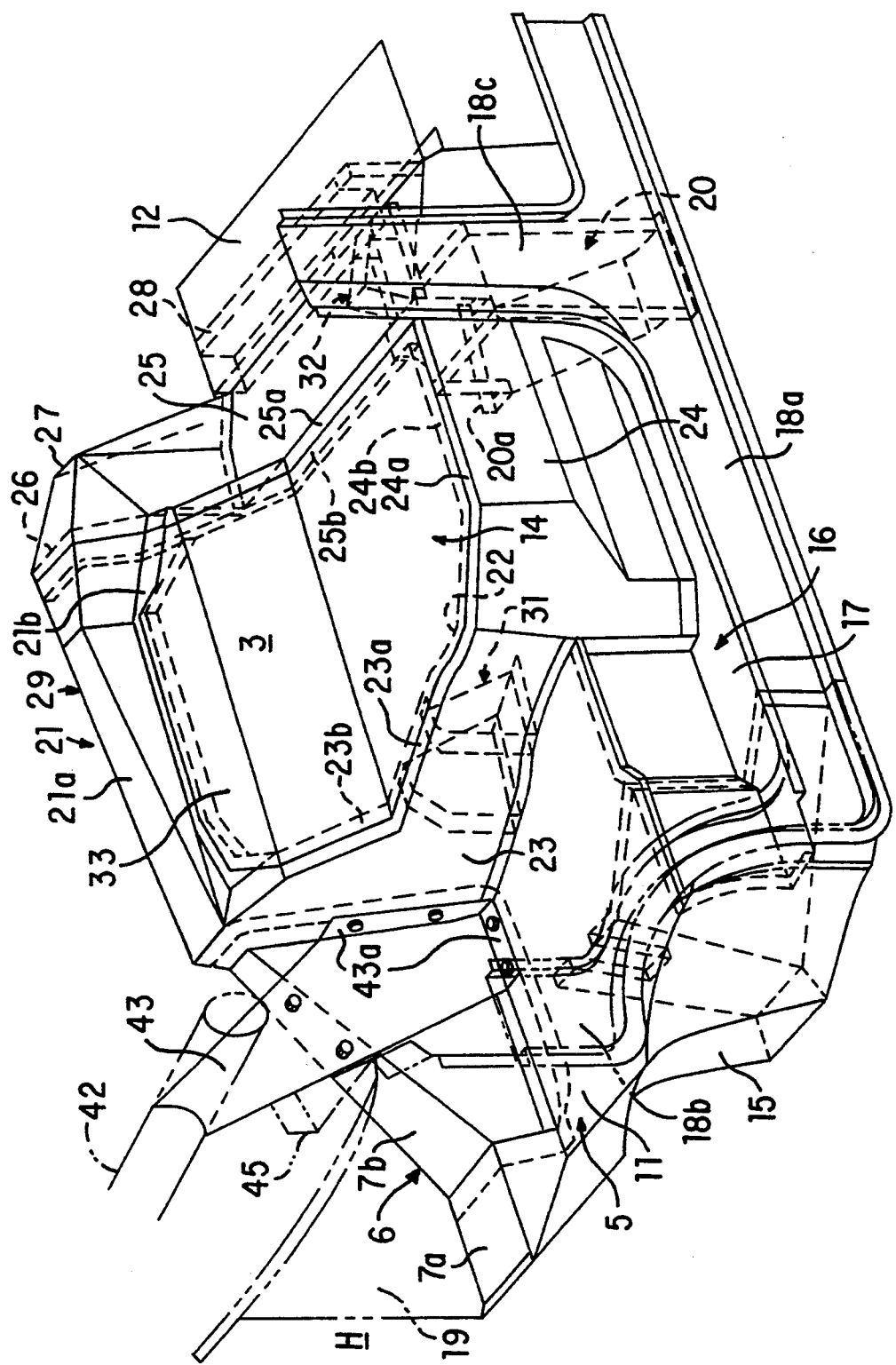
FIG. 3 is a perspective front view of the left side portion of the front, lower body structure.

Referring to FIG. 3, there is provided a generally V-shaped lower front frame member 15, the rear upper end of which is welded, or otherwise secured, to the under surface of the front portion of the front floor panel 11 and the front upper end of which is welded, or otherwise secured, to the under surface of the front end margin of the front floor panel 11 through the lower portion of a dash panel 19 which will be described in detail later. Further, along each side of the front floor panel 11 there is provided a step 16 for the convenience of getting on and off. This step 16 is comprised of a generally L-shaped step panel 17 whose upper side edge is welded, or otherwise secured, to the side edge of the front floor panel 11, and a part of a side sill 18a welded, or otherwise secured, to the lower and outer side edge of the step panel 17. The front portion of the step panel 17 extends forward and is welded, or otherwise secured, to the outer surface of a rear outer end of the lower front frame member 15, and the front end of the step panel 17 is welded, or otherwise secured, to the rear surface of the front portion of the lower front frame member 15.

Side sill 18a is integrally formed with a cowl side member 18b, welded, or otherwise secured, to the outer end of the lower front frame member 15 and extending along the lower front frame member 15, and a center pillar 18c extending upward from the rear end of the step panel 17. Welded, or otherwise secured, to the inner and lower side of the center pillar member 18c of the side sill 18a is a first gusset 20 which has a carrier 20a which externally carries or holds the floor frame member 2 from the below. By means of welding or securing of the floor frame member 2 to the center pillar 18c of the side sill 18a through the carrier 20a, the center pillar 18c formed integral with the side sill 18a is raised in structural rigidity at its lower end. The front floor panel 11 is welded, or otherwise secured, along its lower end to the lower end of the lower dash panel 19 so as to separate the compartment 3 from a space H in which various supplemental devices, such as a battery B and a blower A, are installed. The lower dash panel 19 is welded, or otherwise secured, along its side to the inner surface of the front end portion of the cowl side member 18b formed integral with the side sill 18a.

Seat mount platform 14 is provided with a tunnel extension 21 in the transverse middle thereof which opens underside and forms a part of the tunnel 6. This tunnel extension 21 is comprised of a tunnel member 29 extending to a line connecting left and right center pillars 18a and formed with a lengthwise, substantially horizontal shoulder 21b on each side at a lower level from the top 21a. Forming the horizontal shoulder 21b of the tunnel member 29 avoids structural interference of the tunnel extension 21 with the cylinder banks Ea and Eb of the engine E. Seat mount platform 14 is comprised of a front wall panel 23, a side wall panel 24, a rear wall panel 25 and a seat mount panel 33. These wall panels 23, 24 and 25 are formed with flanges 23b, 24b and 25b, respectively. By means of these flanges 23b, 24b and 25b and the horizontal shoulder 21b of the tunnel member 29, an opening or hole 22 is defined so as to provide an access to the engine E for maintenance and servicing. The front wall panel 23 is welded, or otherwise secured, at its lower edge to the transverse rear end of the front floor panel 11 and the vertical rear end of the rear tunnel portion 7b of the tunnel 6 and extends upward at an approximately right angle from the front floor panel 11 so as to form the upper front end edge of the seat mount platform 14 with its upper front edge 23a. The side wall panel 24 is welded, or otherwise secured, at its lower edge to the inner rear end of the L-shaped step panel 17 and the upper rear end of the side sill 18a and extends upward at an approximately right angle beside the center pillar 18c so as to form the upper side edge of the seat mount platform 14 with its upper side edge 24a. The rear end of the tunnel extension 21 is opened so as to form part of an access opening or hole 26, which will be described in detail later, and is welded, or otherwise secured, at its front edge to the rear end of the tunnel extension 21 and the rear end of the side wall panel 24 and extends rearward inclining downward so as to form the upper rear edge of the seat mount platform 14 with its upper edge 25a. The rear wall panel 25 is welded, or otherwise secured, to the front end of the rear floor panel 12. The seat mount panel 33, on which the inner and outer slide rails 10 are secured, is shaped in conformity with the access hole 22 so as to conceal and seal the access hole 22 defined by the flanges of the respective wall panels 23, 24 and 25. The seat mount panel 33 is connected to a hinge means 51 (which will be described in detail later) secured to the front floor panel 11 so as to turn up and down for opening and closing the access hole 22. The seat mount platform 14 further includes a generally U-shaped second gusset 27 which extends from the rear end 21c of the tunnel extension 21 toward behind the rear wall panel 25 so as to close the part of the opening 26. The seat mount panel 33 is provided with a sealing member 9 (see FIG. 5), such as a hollow rubber tube, secured to its under surface so that the sealing member 9 is pressed down against the flanges 23b, 24b and 25b and the horizontal shoulder 21b when the seat mount panel 33 closes the access hole 22d, thereby sealing the access hole.

A U-shaped cross member 28, opening upward and transversely extending, is welded to the under surface of the rear floor panel 12 and the side wall of the floor frame member 2 so as to provide a transversely extending, closed cross section between the left and right floor frame members 2. Further, a generally trapezoidal third gusset 31 is welded to the rear surface of the front wall panel 23 and the upper surface of the front floor panel 11 extending behind the front wall panel 23 so as to increase the structural rigidity of the front wall panel 23.

In the compartment 3 there is provided forward from the seat mount platform 14 a generally cylindrical member 42, for supporting a steering shaft 41 extending approximately in the lengthwise direction, which transversely extends and is welded, or otherwise secured, at both transverse ends to the cowl side portions 18b, respectively. This member 42 is secured to and supported by a pair of generally triangular-shaped steering stays 43. Each steering stay 43 is formed at its lower end portion with a flange bent laterally at an approximately right angle through which the steering stay 43 is welded, or otherwise secured, to both front wall panel 23 of the seat mount platform 14 and front floor panel 11. The lower portion of each steering stay 43 is located along the side wall of the tunnel 6 and secured to a U-shaped bracket 45 which is welded, or otherwise secured, to the top of the tunnel 6.

Figure 4:
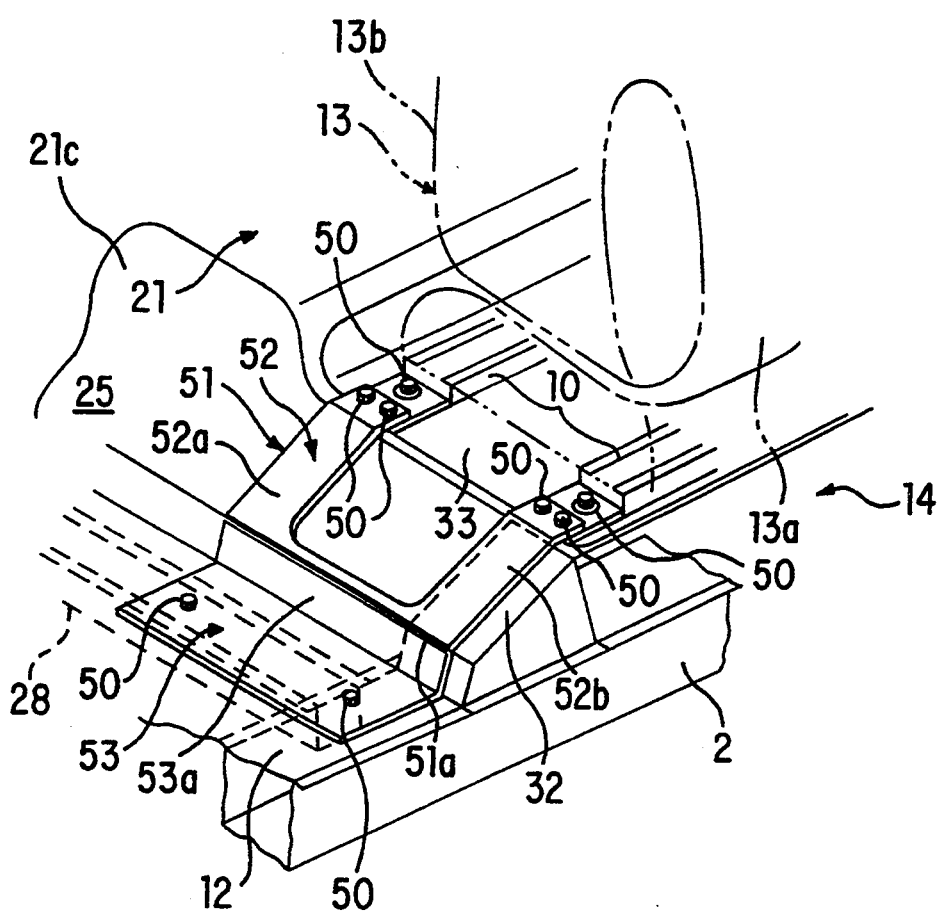
FIG. 4 is a perspective rear view of the right side portion of an essential portion of the front, lower body structure.

Referring to FIG. 4 in conjunction with FIG. 3, between the top surfaces of the left and right floor frame members 2, which are substantially even with the surface of the floor 5, and the upper end edge 25a of the rear wall panel 25, there is provided a generally U-shaped fourth gusset 32 welded, or otherwise secured, to both floor frame members 2 and rear wall panel 25. This fourth gusset 32 is located below a straight line extending from the outer slide rail 10 and is welded, or otherwise secured, to the under surface of the rear wall panel 25. The hinge means 51 is provided between the rear end of the seat mount panel 33 of the seat mount platform 14 and the front end of the rear floor panel 12, which supports the seat mount panel 33 so as to allow it to turn backward toward the rear floor panel 12. This hinge means 51 has a hinge portion 53 with a vertical wall portion 53a bent upward at an approximately right angle from the hinge portion 53, and a U-shaped flap portion 52 having inner and outer arms 52a and 52b, each arm extending forward toward the upper surface of the seat mount panel 33 from the vertical wall portion 53a. The hinge means 51 is secured, on one hand, at the forward ends of the inner and outer arms 52a and 52b to the rear ends of the inner and outer slide rails 10, respectively, with bolts 50 and, on the other hand, at the hinge portion 53 to the rear floor panel 12 with bolts 50. Specifically, the bolts 50 are fastened into nuts (not shown) secured to the under surface of the rear floor panel 12, one of which is positioned within a closed space formed by the cross member 28 secured to the rear floor panel 12 and another is out of the space but above the floor frame member 2 adjacent to the cross member 28. The hinge means 51 has its fold line 51a, laying along and on the upper corner ridge of the fourth gusset 32, along which the flap portion 52 turns up and down.

Figure 5:
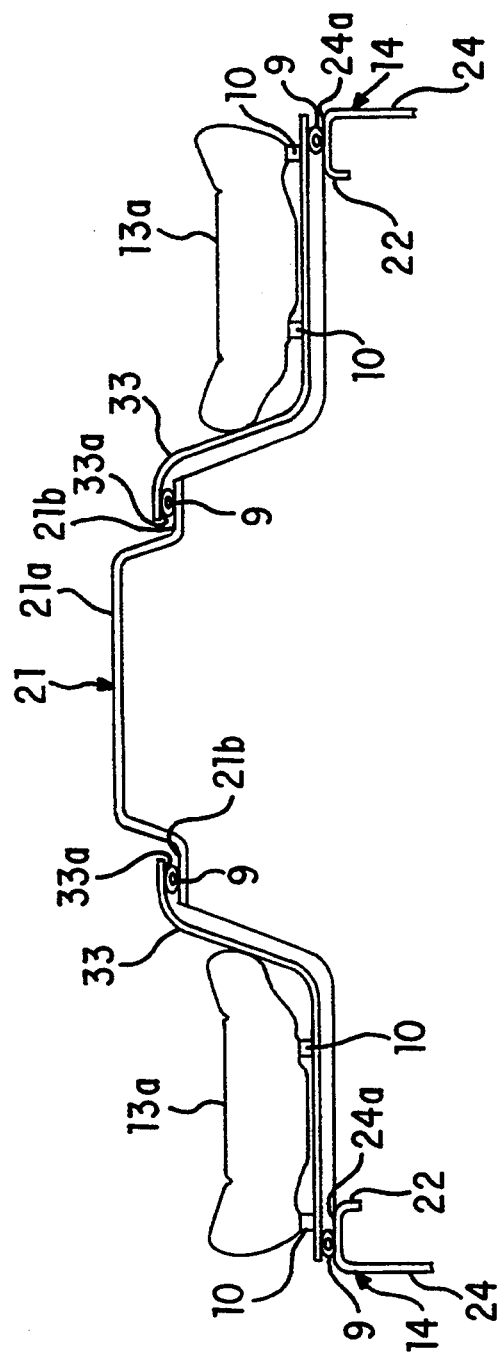
FIG. 5 is a schematic cross-sectional view of the front, lower body structure along a straight line transversely across near the center pillars.
Figure 6:
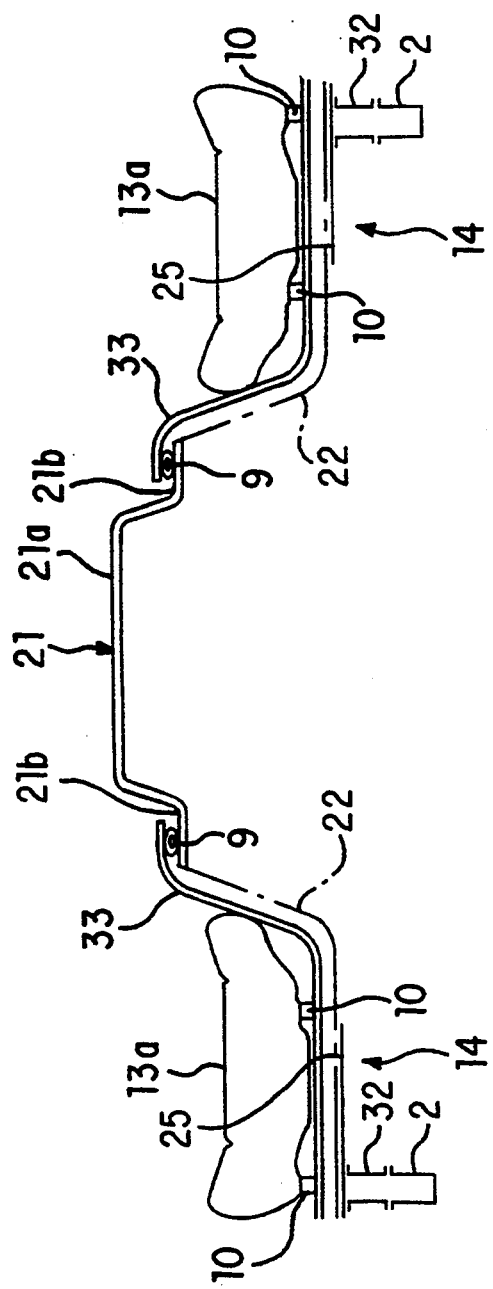
FIG. 6 a schematic cross-sectional view of the front, lower body structure along a straight line transversely across near the third gussets.

Referring to FIGS. 5 and 6 in conjunction with FIG. 3, the access hole 22, defined by the upper edges of the front and rear wall panels 23, 24 and 25, and the horizontal shoulder 21b of tunnel extension 21, extends substantially horizontally from the outside and then inclines inwardly upward to the shoulder 21b of tunnel extension 21 beyond the level of seat cushion 13a. The inner margin 33a of the seat mount panel 33 is bent laterally inward so as to properly fit to the horizontal shoulder 21b of tunnel extension 21.

Figure 7:
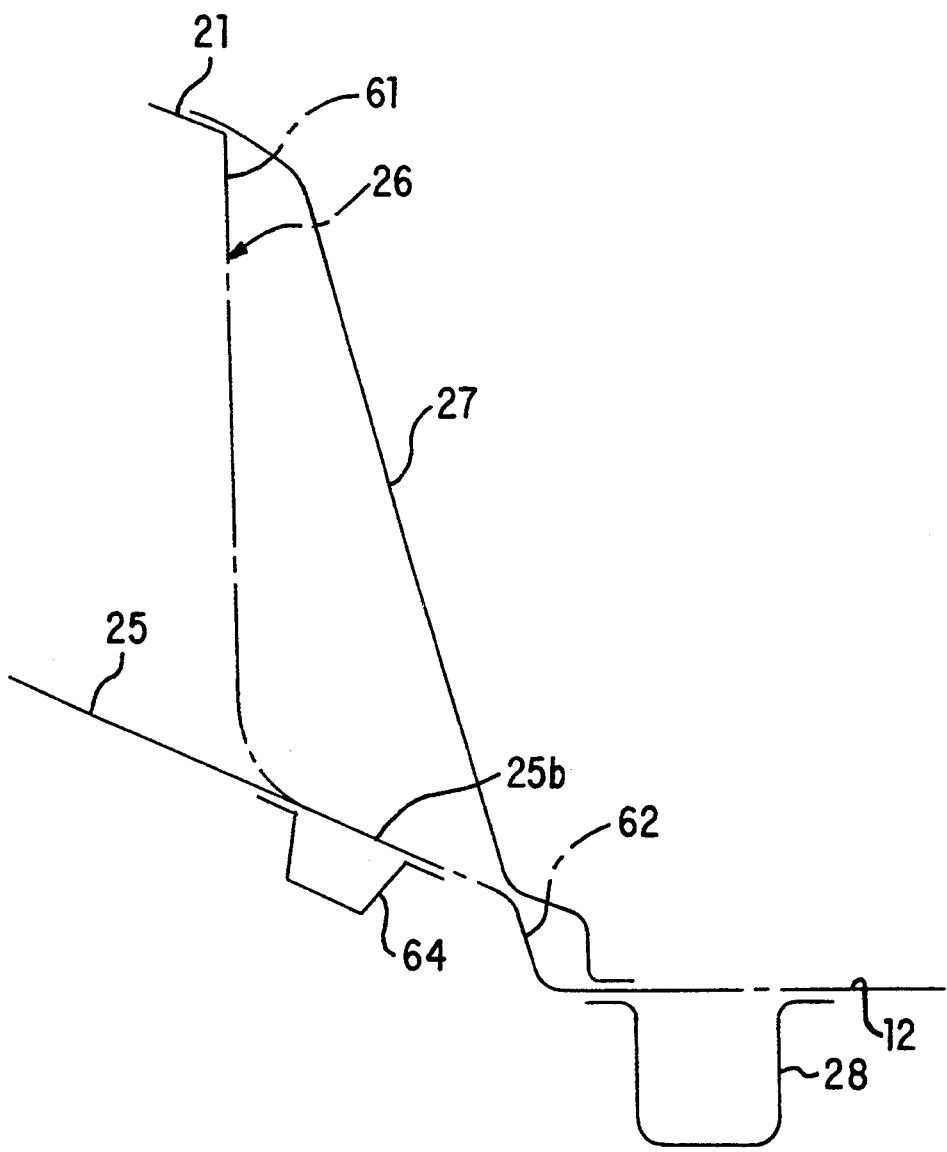
FIG. 7 is an illustration showing an opening for access to an engine from the back.
Figure 8:
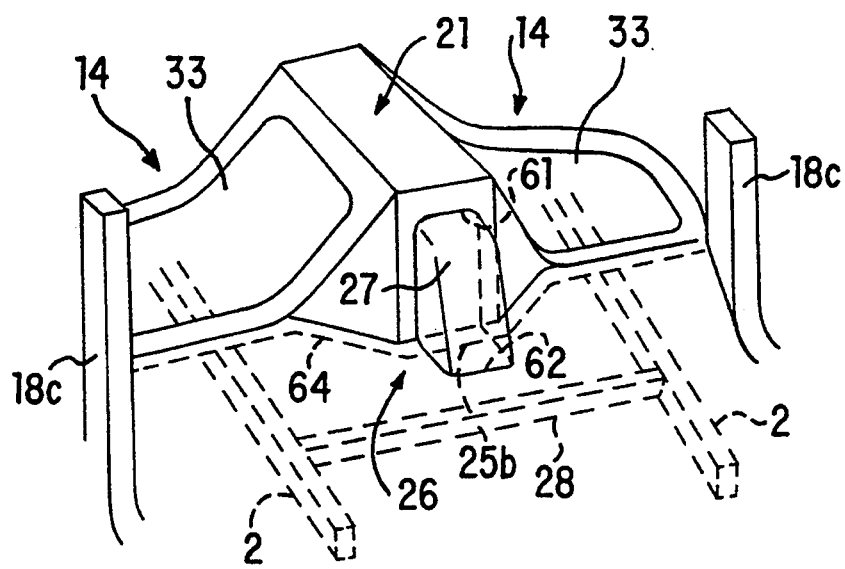
FIG. 8 is a schematic perspective illustration showing the opening for access to the engine from the back.
Figure 9:
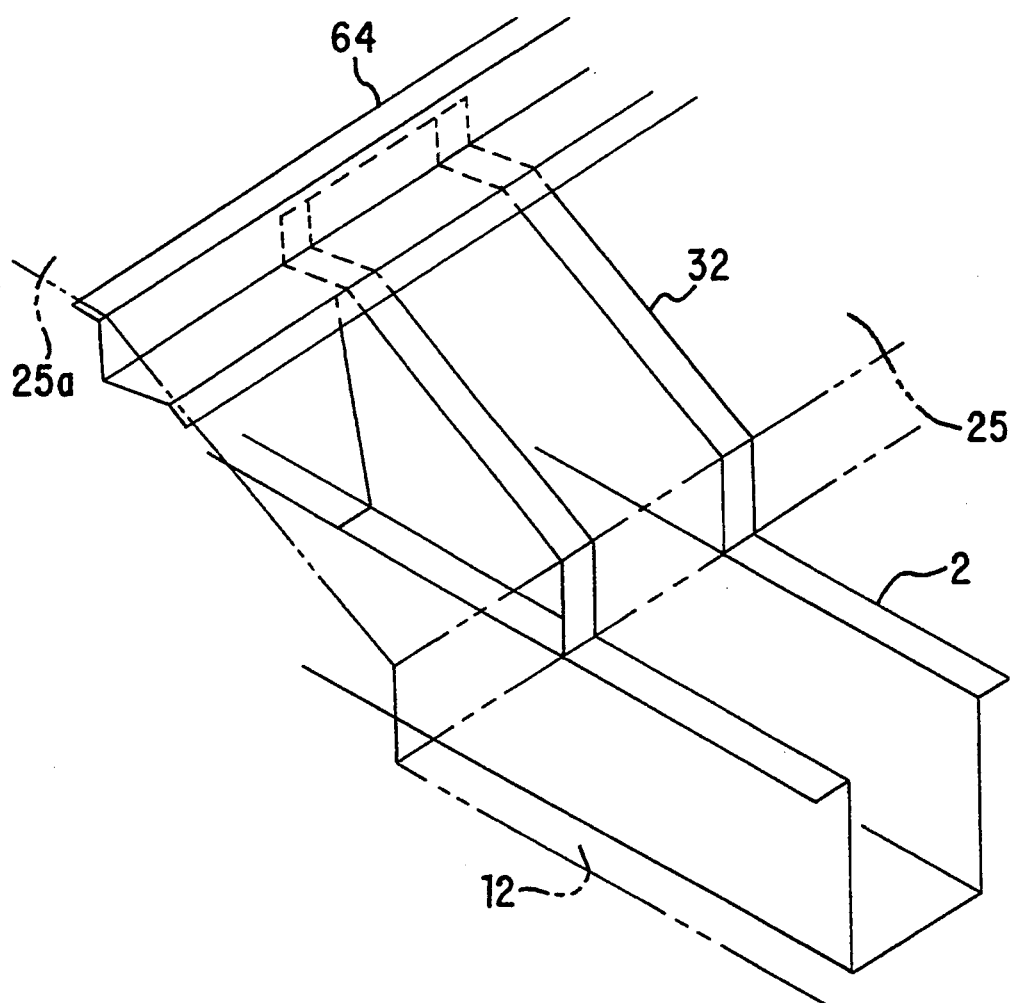
FIG. 9 is a perspective rear view of the third gusset.

Referring to FIG. 7 and 8, the access hole 26 formed partly in the rear end of tunnel extension 21 and partly in the rear wall panel 25 is divided by a partition portion 25b, which is part of rear wall panel 25, into two hole sections, namely an engine access hole 61 and a transmission access hole 62. Specifically, the engine access hole 61 is formed as the rear open end of tunnel extension 21, and the transmission access hole 62 is formed in the inclined portion of rear wall panel 25. A cross member 64 transversely extends between and welded, or otherwise secured, at its opposite ends to the lower ends of left and right center pillars 18c and also welded, or otherwise secured, to the under surface of rear wall panel 25 along the partition portion 25b. This cross member 64 initially extends inwardly in a straight line from the opposite center pillars 18c and then, bends backward in conformity with the lower rear end of tunnel extension 21. As clearly shown in FIG. 9, the cross member 64 is located between and secured to the front upper end of fourth gusset 32 and the front end 25a of rear wall panel 25. In this instance, the cross member 64 is formed to have, on one hand, a generally U-shaped cross section in close proximity of the lower end of engine access hole 61 and the upper end of transmission access hole 62, and on the other hand, a generally V-shaped cross section in close proximity of fourth gusset 32.

Figure 10:
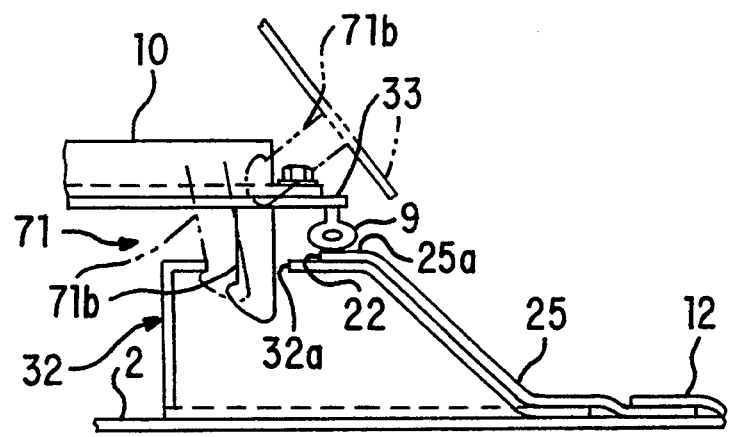
FIG. 10 is a cross sectional view showing a safety means related to the seats along a straight line transversely across near a fourth gusset.
Figure 11:
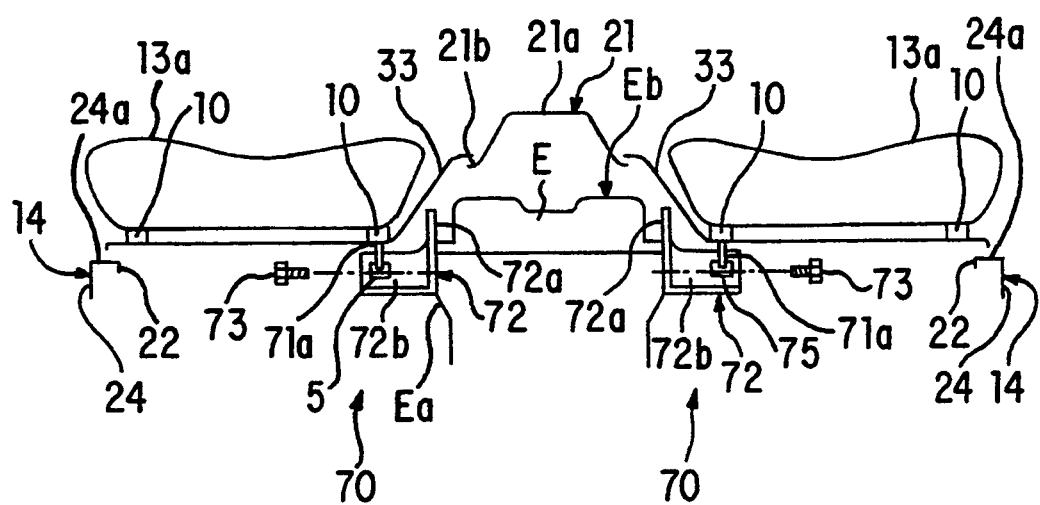
FIG. 11 is a schematic cross-sectional view of the front, lower body structure along a straight line transversely across the seats.
Figure 12:
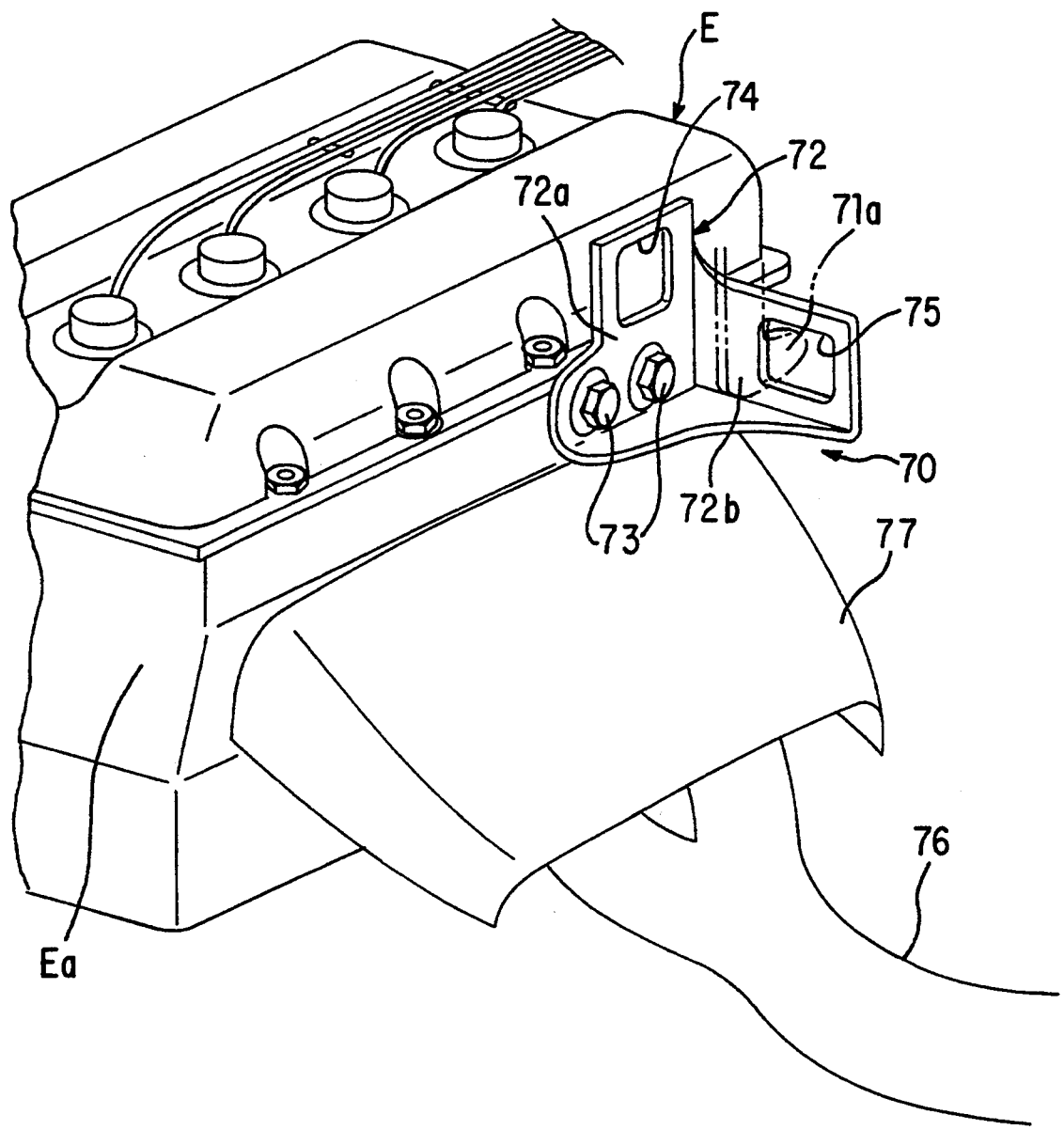
FIG. 12 is a perspective view of a safety means related to the engine.

Referring to FIGS. 10 to 12, each slide rail 10 is provided at its rear end with a safety means 71 having a hook arm 71b which extends downward passing through the seat mount panel 33. This hooked lower end of hook arm 71b extend into the inside the gusset 32 through an opening 32a formed in the top wall of gusset 32 so that the hooked lower end of hook arm 71b is engaged by the top wall of gusset 32 when the seat mount panel 33 tends to abruptly turn upward due, for instance, to abrupt braking of the vehicle. Further, the engine E is provided with a safety means 70 including a L-shaped bracket 72a secured to each side of the cylinder bank Ea, Eb with bolts 73. This bracket 72a is integrally comprised of a first bracket portion 72a attached to the cylinder bank Ea and a second bracket portion 72b bent laterally at an approximately right angle. The base portion 72a is formed with an opening 74 with which a mounting hook arm (not shown) is brought into engagement when the engine E is mounted in the vehicle body. Similarly, the second bracket portion 72b is formed with an opening 75. Within the opening 75 of second bracket portion 72b, a hooked lower end of hook arm 71a extending from the slide rail 10 is located. This hooked lower end of hook arm 71a is also engaged by the bracket 72 when the seat mount panel 33 is abruptly turned upward due, for instance, to abrupt braking of the vehicle. These hook arms 71a and 71b are designed and adapted so as to be brought into engagement only during abrupt upward turn of the seat mount panel 33. In FIG. 12, an exhaust pipe 76 extending from the cylinder bank Ea is covered by means of an insulator 77.

As described in detail above, with the lower body structure in accordance with a preferred embodiment of the present invention, by means of the third gusset 31, which rigidly supports the upper edge 23a of front wall panel 23 relative to the rear end portion of the front floor panel 11 on the floor frame members 2 and the fourth gusset 32, which rigidly supports the upper edge 25a of the rear wall panel 25 relative to the floor frame member 2, the seat mount 14 within which a substantial space is formed is structurally reinforced, in particular, in the lengthwise direction. In addition, not only since the fold line 51a, along which the U-shaped flap portion 52 of the hinge means 51 turns up and down, lays on and along the upper corner ridge of the gusset 32 so that a large load, including the seat 13, exerted to the flap portion 52 is carried by the fourth gusset 32 but also since the cross member 28 provides an increase in rigidity of the fitting structure of the hinge portion 53 of the hinge means 51 to the rear floor panel 12, a direct exertion of great load against the rear floor panel 12 is suppressed during upward turning of the seat mount panel 33. Furthermore, the rear floor panel 12 is prevented from being dented due to the weight of the seat mount panel 33 during upward turning of the seat mount panel 33 to open the access hole 22, so as to provide an easy access into the inside of the seat mount platform 14 for engine servicing, thereby providing an improved performance of working. In addition, since the hinge portion 53 of the hinge means 51 is secured to a part of the rear floor panel 12 where the rear floor panel 12 is backed with the cross member 28 so as to form a closed cross section, the strength of fitting of the hinge portion 53 of the hinge means 51 to the rear floor panel 12 is increased. On the other hand, since the inner and outer arms 52a and 52b of the U-shaped flap portion 52 are secured at their rear ends to the inner and outer slide rails 10, respectively, the structural rigidity of the U-shaped flap portion 52 of the hinge means 51 is increased. In cooperation with laying of the fold line 51a along and on the upper corner ridge of the fourth gusset 32, while a large load, including the front seat 13, exerted to the U-shaped flap portion 52 during upward swinging of the seat mount panel 33, is effectively carried by the fourth gusset 32 and cross member 28, the suppression of a direct exertion of great load to the rear floor panel 12 is realized.

Forming the inner part of the access hole 22 above the level of the seat cushion 13a makes it easy to provide an increased area of the access hole 22. The seat mount panel 33 with an inner margin, which in turn is bent horizontally so as to exactly fit to the horizontal shoulder 21a, increases its own stiffness and assures sealing the access hole 22 in cooperation with the sealing member 9.

The opening 26, which is divided into the engine access hole 61 and transmission access hole 62, provides an easy access to the engine E from the back. The cross member 64 extending between the center pillars 18c and crossing the opening 26 provides an increased structural rigidity of the tunnel extension 21 as well as the structural reinforcement of the center pillars 18c.

Furthermore, because the seat mount panel 33 is interconnected by means of the safety hook means to the lower floor structure and or the engine E so as to prevent the seat mount panel 33 from turning upward when a great deal of energy is applied to the seat 13 due to abrupt braking, not only the occupant seated on the seat 13 is protected against falling down backward, but also the seat mount platform 14 and, in particular, the front wall panel 23 is prevented from being broken. Because the steering stays 43 are secured to the steering member 42, the front floor panel 11, the front wall panel 23 of the seat mount platform 14 and the side wall of the center tunnel 6 and interconnected by means of the bracket 45, the front wall panel 23 is given by the steering stays a sufficient rigidity against a great energy applied thereto during abrupt braking and prevented by the same from being broken. The front, side and rear wall panels 23, 24 and 25 of the seat mount platform 14 are supported by the gussets 20, 31 and 32, respectively, so as to provide the seat mount platform 14 with a sufficient structural rigidity, thereby preventing it from being adversely affected by vibrations of the vehicle body.

It is apparent in the lower body structure of above described embodiment that the hinge means may interconnect the seat mounting platform itself to the rear floor panel so that the seat mount plat form turns up and down. The seat mount platform may be supported from the back only by means of the fourth gusset without being supported from the front by means of the third gusset. Further, the fourth gusset may be installed below the extension line from the inner slide rail in place of being installed on the extension line from the inner slide rail. The opening may be not always divided into two sections for an engine access hole and a transmission access hole but may only serve for an engine access hole.

It is to be understood that although the present invention has been described in detail with respect to a specific, preferred embodiment thereof, various other embodiments and variants may occur to those skilled in the art, which fall within the scope and spirit of the present invention. Such other embodiments and variants are intended to be covered by the following claims.

What is claimed is:

1. A structure of the lower body portion for an automotive vehicle in which two seats are separately placed side by side above a power unit, including at least an engine, mounted vertically across a floor of a vehicle compartment, said power unit being accessed through an access hole, said lower body structure comprising:

seat mount means, disposed above said access hole, for mounting thereon said seat;

gusset means, secured to said floor and abutting against said seat mount means, for supporting said seat mount means from the back of said seat mount means; and hinge means, foldable along a fold line provided between a hinge portion secured to said floor and a flap portion secured to said seat mount means, for allowing said seat mount means to be turned up and down about said fold line to open and close said access hole, said hinge means being disposed so as to establish said fold line on said gusset means.

2. A lower body structure as defined in claim 1, wherein said floor is comprised of a pair of floor frame members, each of which extends in the lengthwise direction on each side of the vehicle, and a floor panel placed between and secured to said floor frame members.

3. A lower body structure as defined in claim 2, and further comprising a cross member transversely extending and secured to said floor where said hinge portion is secured.

4. A lower body structure as defined in claim 2, wherein said seat mount means includes modesty wall means extending upward from said floor for defining said access hole with its upper edge.

5. A lower body structure as defined in claim 4, wherein said modesty wall means is configured to have a horizontal upper edge portion and an inclined upper edge portion extending inwardly upward from said horizontal upper edge portion.

6. A lower body structure as defined in claim 5, wherein said mount means comprises a seat mount panel on which said seat is mounted, said seat mount panel being configured so as to close and seal said access hole and being connected at its rear end to said flap portion of said hinge means so as to turn up and down about said fold line.

7. A lower body structure as defined in claim 6, wherein said seat mount panel has an inner side margin for horizontally sealing an inner side edge of said access hole.

8. A lower body structure as defined in claim 6, wherein said seat mount means further comprises a pair of slide rails secured to said seat mount panel on which said seat is mounted for back and forth sliding movement.

9. A lower body structure as defined in claim 8, wherein said flap portion of said hinge means is connected to said slide rails.

10. A lower body structure as defined in claim 2, further comprising a tunnel member projecting approximately vertically into said compartment from said floor and extending in a lengthwise direction of the vehicle between said two seats, said tunnel member being provided with an opening in its rear end for an access to said power unit.

11. A lower body structure as defined in claim 10, wherein said opening is reinforced by means of a cross member transversely extending within said compartment.

12. A lower body structure as defined in claim 11, further comprising gusset means, to which said cross member is secured, for interconnecting each said floor frame and said floor panel.

13. A lower body structure as defined in claim 11, wherein said opening is divided into upper and lower sections by means of said cross member.

14. A lower body structure as defined in claim 11, wherein said power unit includes an engine and a transmission, mounted behind the engine, said engine and transmission being arranged so as to be accessed through said upper and lower sections of said opening, respectively.

15. A lower body structure as defined in claim 2, further comprising safety means, disposed between said seat mount means and each said floor frame member, for restricting said seat mount means from being turned upward when a great deal of energy is abruptly applied backward to each said seat.

16. A lower body structure as defined in claim 15, wherein said safety means comprises gusset means for interconnecting each said floor frame and said floor panel and hook means for being brought into engagement with said gusset when said seat mount means tends abruptly to be turned upward.

17. A lower body structure as defined in claim 16, wherein said seat mount means comprises a pair of slide rails secured thereto on which each said seat is mounted for back and forth sliding movement, and said hook means is mounted on each said slide rail.

18. A lower body structure as defined in claim 2, further comprising safety means, disposed between said seat mount means and said power unit, for restricting said seat mount means from being turned upward when a great deal of energy is abruptly applied backward to each said seat.

19. A lower body structure as defined in claim 18, wherein said safety means comprises a bracket secured to said power unit and hook means for being brought into engagement with said bracket when said seat mount means tends abruptly to be turned upward.

20. A lower body structure as defined in claim 19, wherein said seat mount means comprises a pair of slide rails secured thereto on which each said seat is mounted for back and forth sliding movement, and said hook means is mounted on each said slide rail.

* * * * *